United States Patent [19]

Tank

[11] Patent Number: 4,924,478
[45] Date of Patent: May 8, 1990

[54] METHOD OF AND DEVICE FOR CONTACTLESS TEMPERATURE MEASUREMENT OF AN OBJECT INDEPENDENTLY OF RADIATION EMISSIVITY

[75] Inventor: Volker Tank, Eching a.A., Fed. Rep. of Germany

[73] Assignee: Deutsche Forschungs- und Versuchsanstalt fur Luft- und Raumfahrt E.V., Cologne, Fed. Rep. of Germany

[21] Appl. No.: 620,553

[22] Filed: Jun. 14, 1984

[30] Foreign Application Priority Data

Jun. 16, 1983 [DE] Fed. Rep. of Germany ....... 3321874
Jun. 16, 1983 [DE] Fed. Rep. of Germany ....... 3321875

[51] Int. Cl.$^5$ .............................................. G01J 5/00
[52] U.S. Cl. ....................................... 374/121; 374/9; 364/557
[58] Field of Search ................... 374/9, 126, 128, 129, 374/120, 121; 356/43, 45; 364/557

[56] References Cited

U.S. PATENT DOCUMENTS

| | | | |
|---|---|---|---|
| 3,401,263 | 9/1968 | Birkebak | 374/9 |
| 3,483,378 | 12/1969 | Murray | 374/129 |
| 3,539,807 | 11/1970 | Bickel | 374/9 |
| 4,120,200 | 10/1978 | Braun | 374/129 |
| 4,142,417 | 3/1979 | Cashdollar et al. | 356/45 |
| 4,225,230 | 9/1980 | Dostoomian et al. | 356/45 |

FOREIGN PATENT DOCUMENTS

| | | | |
|---|---|---|---|
| 1161701 | 1/1964 | Fed. Rep. of Germany | 356/45 |
| 3115887 | 11/1982 | Fed. Rep. of Germany | . |
| 134324 | 10/1980 | Japan | 374/126 |
| 763699 | 9/1980 | U.S.S.R. | 374/126 |
| 1454348 | 11/1976 | United Kingdom | 374/121 |

OTHER PUBLICATIONS

Laid-Open Japanese application publication 1980 by Nippon Steel Corp., Tohru Iuchi.

*Primary Examiner*—William A. Cuchlinski, Jr.
*Assistant Examiner*—W. Morris Worth
*Attorney, Agent, or Firm*—Collard, Roe & Galgano

[57] ABSTRACT

A method of and device for contactless measuring of temperature of an object independently of its emissivity in infrared and/or visible range, is based on finding, by means of Planck law of radiation a curve which is the sum of the radiance or radiant intensity of a radiator having temperature and emissivity of the object and the radiance or radiant intensity of a radiator having the temperature of environment, the latter radiation being reflected by the object with the reflectivity $\rho = 1 - \epsilon$ where $\epsilon$ is the emissivity of the object. The actual temperature of the object is found from the curve which is most similar to the curve of at least two values of radiance or radiant intensity detected from the object, plotted against the wavelengths. The device for carrying out the method includes a spectrometer, a modulator rotating at constant speed and having at least two filtering segments for the radiation wavelengths, an analog/digital converter clocked by pulses derived from the modulator to produce at its output digital signals, a microprocessor for reiteratively processing the digital data according to the Planck law of radiation, and a display unit for reading out the computed emissivity, the temperature of the object and the temperature of the environment.

7 Claims, 5 Drawing Sheets

| MODULATOR SEGMENT | TRANSMISSION RANGE | |
|---|---|---|
| | cm$^{-1}$ | µm |
| A | 995 – 1005 | 9,95 – 10,05 |
| B | 1082 – 1092 | 9,16 – 9,24 |
| C | 2465 – 2475 | 4,04 – 4,06 |
| D | 2627 – 2637 | 3,79 – 3,81 |
| E | 2852 – 2862 | 3,49 – 3,51 |
| F | 4295 – 4305 | 2,32 – 2,33 |
| G | | |
| H | | |

METHOD OF AND DEVICE FOR CONTACTLESS TEMPERATURE MEASUREMENT OF AN OBJECT INDEPENDENTLY OF RADIATION EMISSIVITY

BACKGROUND OF THE INVENTION

The invention relates in general to contactless radiation measurement to determine the temperature of an object independently of its emissivity as well as to a method of determining spectral emissivity of an object, and also to a device for carrying out the method.

The radiation measurement to determine the temperature and/or emissivity of a natural or artificial object can be performed in infrared and/or visible spectral range (when measuring glow temperatures, for example), measuring spectral radiance or spectral radiant intensity.

Contactless measurements of this kind are applicable in technological processes, where quality of processed products depends strongly on the maintenance of preset temperatures or temperature variations; for example, such requirements occur during firing of highly accurate ceramic parts, melting of metal alloys, or zone drawing of semiconductive materials for doping. In prior art temperature measurements of this kind, there is the difficulty that if the emissivity of the object under measurement is not known, only an apparent temperature and not the actual temperature of the object can be measured.

This is due to the fact that in radiation temperature measurement, the sum of two radiation components is measured, namely radiation emitted by the object according to its temperature and its emissivity $\epsilon$ and ambient radiation (corresponding to the temperature of environment) reflected from the object according to its reflectivity $\rho$.

Only with the knowledge of the emissivity of the object the two components can be separated one from the other. (It is assumed that radiation transmittance of the object is negligible.)

Therefore, the disadvantage of known methods and devices of this kind is the fact that they cannot measure the emissivity and, consequently, the emitted radiation component and the reflected radiation component cannot be separated.

Known are so called emission meters by means of which emissivity of materials for scientific applications can be measured in laboratories. These instruments, however, are unsuitable for use under real manufacturing conditions in processing or construction or building technology, for example. Such measurements under real conditions in practice are of particular interest inasmuch as they enable also to find out the effect of weathering and aging on the emissivity of objects.

In building industry and in solar technology the knowledge of emissivity of materials and construction substances is important also due to the fact that it enables to optimize the radiation balance of buildings or solar collectors to save energy. For instance, it is desirable that a solar collector receive as much radiation from sun, as possible while an apartment or office building should radiate a minimal amount of infrared radiation into environment.

Also in many application fields using remote sensing from airplanes or satelites, the knowledge of emissivity of materials and natural or artificial objects is an essential prerequisite for achieving quantitatively interpretable results. (For example in remote prospecting for mineral resources, in mineralogy, geology, agriculture and forestry, in protection of environment, city planning, climatology, classification and the like).

In conventional methods of contactless temperature measurements used in practice, there are employed radiometers or pyrometers which measure integrally radiation in a relatively broad spectral range between about 3.0 to 3.5 $\mu$m or 8.0 to 14.0 $\mu$m. From the radiance or radiant intensity integrated within the spectral range, only an apparent temperature of the object is determined by a calibrating measurement. Since the measuring and calibrating processes can be performed only rarely under identical geometrical conditions (distances), an error in the temperature determination would result, as it will be explained below in connection with FIGS. 1 and 2. Moreover, when the emissivity of an object is not known and differs from unity ($\epsilon \neq 1$) the result becomes still more erroneous because without correction it would be correct only if the object would be a black body, having emissivity $\epsilon = 1$ just as the calibration standard.

In prior art methods for determining emissivity, there are used the so called emission meters, in which a sample or specimen of a material, or of an object to be measured is placed in a closed, temperature stabilized housing with black inner walls (i.e. emissivity of inner walls equals 1), and heated to a temperature which exceeds the temperature of the housing.

Provided that the temperatures of the housing and of the sample are known, (FIG. 2) the emissivity of the sample can be determined by means of two radiation measurements, namely of those of the heated sample and of the black inner wall of the housing. Moreover, it is necessary that the temperature distribution both on the sample and on the housing be homogenous. However, a homogenous temperature distribution on the housing cannot be guaranteed especially in the case of high temperatures of the sample, because the wall absorbs the sample radiation and heats up. An accurate temperature detection on the inner wall of the housing is extremely difficult. Due to the heating process, the temperature of the probe is in general non-homogenous.

Known is also a method of and a device for contactless measurement of infrared radiation temperature of a natural or artificial object in which the radiation measurement is made in two or more delimited spectral ranges in which the transmissivity of atmosphere equals at least approximately to unity (1). To determine in a single measuring cycle the temperature and/or emissivity of the object, a characteristic curve of spectral radiance is computed from the measured radiation intensities in different spectral ranges, by iterative computation by the aid of Planck radiation law, in such a way that the temperature is determined of a black body whose spectral radiance curve extends parallel to the measured intensities. The emissivity of the object can be determined from the ratio between the measured intensities and corresponding intensities of the computed black body (DE-OS3,115,887).

From the above considerations it can be deduced that prior art method and devices for contactless temperature measurement can provide an unambiguous temperature reading only after the knowledge of the emissivity of the object of measurement, and of the ambient radiation or ambient temperature. In addition, it is also necessary to correct effects of the atmosphere by detecting the transmissivity of the latter.

The disadvantage of the prior art method and devices for emissivity measurement is the fact that temperatures of the measured sample or probe and of the measuring housing cannot be determined from radiation measurements employed for the emissivity determination. Moreover, the temperature measurement of samples in a glowing condition (glowing melts) is either completely impossible or extremely inaccurate (due to missing information about emissivity) by means of pyrometers. In this case a strong heating of the measuring housing takes place producing a further measuring error. A further disadvantage of the known method and device for emissivity measurement is therefor to be seen in their unsuitability for measuring at high temperatures (of glowing melts, for example). To solve the before mentioned difficulties concerning the constant temperature and temperature distribution of the probe, expensive regulating systems for ceoling the housing are necessary which render the existing methods and devices too costly for practical use.

SUMMARY OF THE INVENTION

It is, therefore, a general object of this invention to overcome the afore-mentioned disadvantages.

More particularly, it is an objective of this invention to provide an improved method of and a device for a contactless temperature measurement which is independent of the emissivity of the object under measurement, and which, at reduced expenditures, provides more accurate results.

Another objective of this invention is to determine simultaneously with the temperature also the emissivity of the measured object and also the ambient temperature, if desired.

An additional objective of this invention is to measure the emissivity of a sample in a measuring housing and simultaneously the temperature of the sample and the temperature of the housing in a single measuring cycle.

In keeping with these objectives and others which will become apparent hereafter one feature of this invention resides in measuring spectral radiances or spectral radiant intensities of the object in a plurality of visible and/or infrared wavelength ranges and plotting a first curve of at least two measured values of radiance or radiant intensity versus wavelengths, then computing a second curve (most similar to the first), by the aid of Planck radiation law and using the measured values of radiance or radiant intensity as a sum of the radiance or radiant intensity of a radiator having the temperature and emissivity of the object under measurement, and of the radiance or radiant intensity of a radiator having the temperature of the environment (ambient temperature), reflected by the object with a reflectivity $\rho = 1 - \epsilon$ where $\epsilon$ is the emissivity, and using the corresponding temperature in the second curve which is most similar to the first curve, as the true temperature of the object.

From this novel method it is thus possible to measure accurately the actual temperature of the object without the knowledge either of its emissivity nor of the ambient temperature or to measure emissivity of a sample in a measuring housing without the knowledge of temperature of the sample and housing.

A particular advantage of this invention resides in the possibility to measure also ambient temperature or, in a single measuring cycle, both the sample and housing temperatures. Accordingly, additional devices for detecting the emissivity of the object or for measuring transmissivity of the atmosphere, or for measuring temperature of the sample, of the measuring housing or of the environment, are no longer necessary. When transmissivity $\pi$ of the atmosphere deviates from unity, a corresponding correction can be made.

If it is desired to measure temperature and emissivity of the object, and ambient temperature or respectively emissivity, and temperature of a sample and, inner temperature of the measuring housing, then for carrying out the method of this invention radiation measurements in three delimited spectral ranges are necessary.

If the ambient temperature is known, or if respectively temperature or radiation of the inner wall of the housing is known, then measurements in two spectral ranges are sufficient.

Another advantage of this invention is to be seen in the possibility to determine temperature and emissivity of objects which are neither gray nor black and whose emissivity is therefore dependent on the wavelength. Of course, in this case measurements in several delimited wavelength ranges are necessary. A minor problem of atmospheric influences resulting from the relatively short measuring path in the housing in the case of emissivity measurement again if necessary can be solved in such a manner that the measuring housing is purged (filled) with gas transparent to infrared radiation such as for example nitrogen.

In the case of temperature measurement by means of the method of this invention it can be further determined the actual temperature and the product of the emissivity and the size of the radiating surface of the object. By means of the measured actual size of the radiating surface of the object the emissivity of the latter can be also computed. The first case (temperature and emissivity) thus relates to a radiance measurement whereas the second case temperature, emissivity and size of surface relates to radiant intensity measurement.

The problem of the effects of ambient atmosphere is solved according to another feature of this invention by making a spectral radiometric measurement of emitted radiation, that is the radiation is measured in several definite more or less narrow spectral ranges, where these spectral ranges are selected so that the transmissivity of atmosphere in the selected wavelengths be equal substantially to unity. Suitable infrared spectral ranges are readily recognizable from FIG. 1.

The entire visible or infrared spectral range is suitable for carrying out the method of this invention. In the visible range of course the ambient temperature or respectively the temperature of the measuring housing are not measured but instead a temperature which is derived from the visible ambient radiation or from the visible radiation reflected on the walls of the housing.

From radiation intensities measured spectral radiometrically from three spectral ranges, for example, the radiation intensity curve is computed by iteration according to the following equations 1 through 3 or 1' through 3':

$$L_{M, 21} = \epsilon \cdot L_{TObj, 21} + (1-\epsilon) \cdot L_{TUmg, 21} \qquad (1)$$

$$L_{M, 22} = \epsilon \cdot L_{TObj, 22} + (1-\epsilon) \cdot L_{TUmg, 22} \qquad (2)$$

$$L_{M, 23} = \epsilon \cdot L_{TObj, 23} + (1-\epsilon) \cdot L_{TUmg, 23} \qquad (3)$$

$$L_{M, 21} = \epsilon \cdot L_{TObj, 21} + (1-\epsilon) \cdot L_{TGch, 21} \qquad (1')$$

$$L_{M, \lambda 2} = \epsilon L_{TObj, \lambda 2} + (1-\epsilon) \cdot L_{TGeh, \lambda 2} \quad (2')$$

$$L_{M, \lambda 3} = \epsilon L_{TObj, \lambda 3} + (1-\epsilon) \cdot L_{TGeh, \lambda 3} \quad (3')$$

$$(\rho = 1 - \epsilon)$$

wherein $L_{M, \lambda 1}$ is the measured radiance at the wavelength $\lambda_1$ $L_{TObj, \lambda 1}$ is radiance of a black body having a temperature $T_{obj}$ computed according to Planck radiation law or radiance of a sample, at the wavelength $\lambda_1$ $\epsilon$ is the emissivity of the object or of the sample $L_{TUmg, \lambda 1}$ is radiance of a black body at an ambient temperature $T_{umg}$ computed according to Planck radiation law, at the wavelength $\lambda_1$ $L_{TGeh, \lambda 1}$ is radiance of a black body at a temperature $T_{Geh}$ of the measuring housing, computed according to Planck radiation law at the wavelength $\lambda_1$ $(1-\epsilon)$ is reflectivity of the object or of the probe.

From the three equations 1 through 3 or 1' through 3', the three undefined magnitudes $\epsilon$, $T_{obj}$, $T_{Umg}$ or $\epsilon$, $T_{Obj}$ and $T_{Geh}$, can be iteratively determined. Of course, in measuring more than three spectral ranges (wavelengths) the system is determined in redundancy and the computation will lead to more accurate results (considering the limits of the measuring accuracy). It is also possible, in the case of a non-grey or a non-black body to determine the emissivity $\epsilon$ for different wavelengths. In radiant intensity measurements there results the actual temperature and the product of the emissivity and the size of the radiating surface of the object. From the measurement of the actual size of the radiating surface the computation of the emissivity is possible.

If in the case of emissivity measurement radiation from the inner wall of the measuring housing has been measured (FIG. 8), then only two measurements and two spectral ranges are needed. Whereas in this case two identical measurements (namely of the sample and of the wall of the measuring housing), are made in the same (two) spectral ranges each, the iterative computation is made on the following modification of the equations 1 and 2:

$L_{TGeh, \lambda 1}$ is substituted by $L_{MGeh, \lambda 1}$ $L_{MGeh, \lambda 2}$ is the measured radiation density of the inner wall of the housing at the wavelength $\lambda 2$.

For the case that the sample is neither a black nor a grey radiator and hence its emissivity is dependent on the wavelenth, it is still possible to determine this emissivity for the discrete wavelengths of the measurement. From the measurement at n wavelengths it is possible to determine the emissivity for at least n−2 wavelengths; if the radiation of the inner wall of the housing is additionally measured (FIG. 8), then the emissivity for n−1 wavelengths is determined.

According to the above considerations, the actual temperature and emissivity of the object or respectively the emissivity and the actual temperature of the sample, or the actual temperature and the product of the emissivity and the size of the radiating surface of the object, can be simultaneously determined in a quasi real time period from a single measuring cycle. Apart from this, there results also the ambient temperature, or respectively the temperature of the measuring housing.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
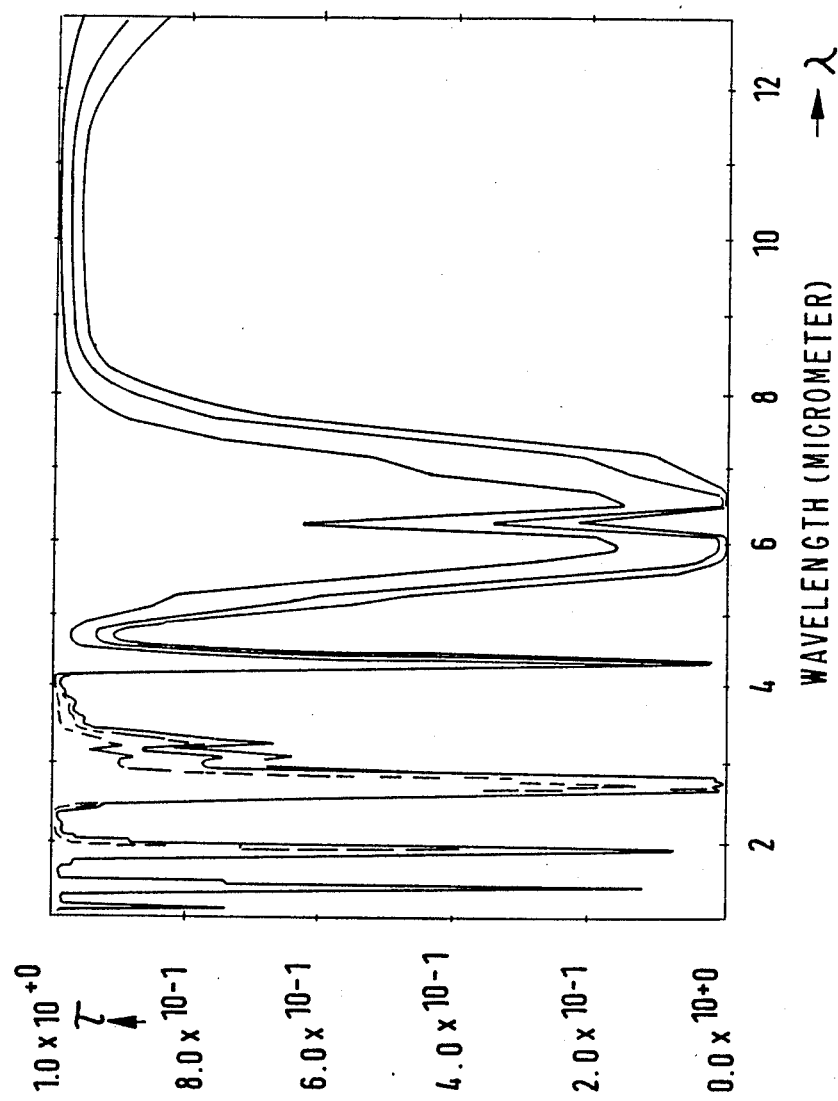
FIGS. 1 and 2 show respectively a graphic representation of transmissivity of the atmosphere, and the spectral radiance of a black body in dependency on the wavelength.

In the diagram of FIG. 1, the wavelength $\lambda$ (in micrometers) is plotted on the abscissa and the transmissivity $\tau$ of the atmosphere for 10, 50 or 100 m path lengths are plotted on the ordinate.

Figure 2:
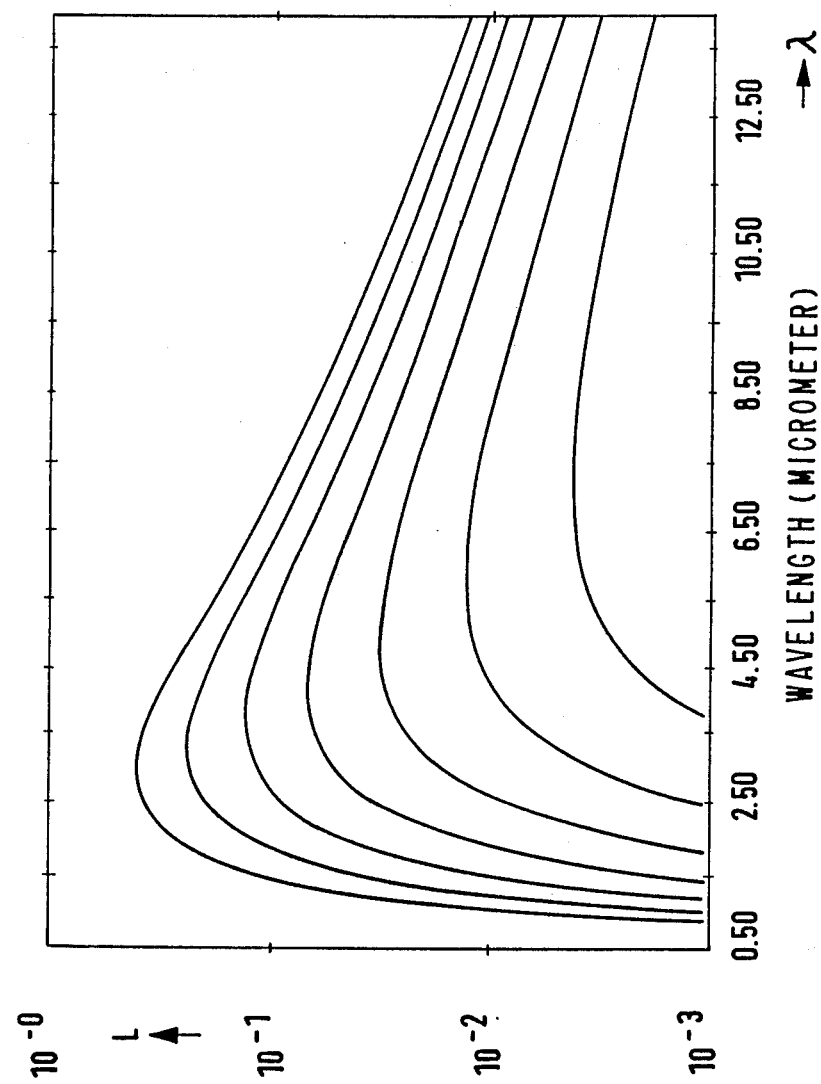

In FIG. 2 the wavelength $\lambda$ in micrometers is also plotted on the abscissa and the spectral radiance (in $W \cdot cm^{-2} \cdot sr^{-1} \cdot micrometer^{-1}$) is on the ordinate.

The curves in FIG. 2 show the spectral radiance of a black body ($\epsilon = 1$) for different temperatures (400 through 1,000 $\theta K$). Generally, natural or artificial objects and environment are not black bodies but they are grey bodies whose emissivity is less than 1. Radiance curves of black and grey bodies having the same temperature differ one from the other by a constant factor, the emissivity $\epsilon$, whereby the grey body due to its smaller emissivity has a smaller radiance. Therefore, the radiance curve of such grey body in FIG. 2 is below that of the black body. This means that depending on the emissivity the radiance curves of all black and grey objects having the same temperature differ from one another about the factor $\epsilon$, and consequently the radiated total intensity is different and for the grey bodies is composed of two components of which one is proportional to the emissivity and the other depends on the ambient radiation and is proportional to the reflectivity of the object.

Bodies which are neither black nor grey have an emissivity $\epsilon$ which is dependent on the wavelength and consequently this emissivity is not constant. Moreover, this emissivity at least in the range of high temperature is temperature dependent for most materials.

In the embodiment of the temperature measuring device according to FIG. 3, infrared radiation emitted from an object O is collected by a telescope T, deviated and focussed on a modulator N which will be described in detail with reference to FIG. 4. The modulated radiation beam is focussed by a field lens FL on a detector D. Electrical signals at the output of the detector which are caused by and are proportional to the impinging radiation are amplified in an amplifier V and converted by means of an analog/digital converter and a clock signal from a timing logic circuit into a digital signal. The rate of the clock signal is derived from a light barrier L cooperating with the modulator M and processed in the timing logic circuit. The digitalized measuring values are processed by iteration of Planck radiation law in a microcomputer which thus computes the object temperature $T_{Obj}$, emissivity $\epsilon$ and ambient temperature $T_{Umg}$. The actual temperature $T_{Obj}$ of the object, the emissivity and the ambient temperature are displayed on a display unit. If desired, the actual size of the radiating surface of the object can be also displayed.

The microcomputer includes an input command unit by means of which the data entry and the iterative computation are started. These input data may also include the surface size of the measured object or, as it will be explained below in connection with FIGS. 4 and the table in FIG. 5 they can be used for the selection of certain spectral ranges employed in the measurement.

Figures 4, 5:
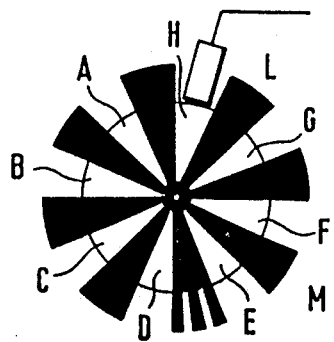
FIG. 4 is a plan view of a modulator from the embodiments according to FIGS. 3 or 8, shown on an enlarged scale.
FIG. 5 is a table showing transmission ranges assigned to the modulator of FIG. 4.

Referring to the embodiment of the modulator M shown in FIG. 4, a segmented disc of the modulator M rotates at a constant speed which matches the time constant of the detector D. In this example, the segmented disc consists of 16 circle segments of equal size of which the consecutive segments are alternately made of material which is impervious to the radiation, such as, for example, of aluminum, and of infrared filters A through H or of filters for visible radiation, the filters being of a smaller radius than the radiation impervious segments of aluminum. The infrared filters under circumstances can be adjusted for specific applications, especially for emissivity measurement, or for example, they can be selected for contactless temperature measurement in ranges shown in the table in FIG. 5. These ranges correspond to high transmission of the atmosphere as can be derived from FIG. 1. The last two modulator segments G and H which have been left empty in the table of FIG. 5 can, if desired, be equipped with additional filters. For the range of visible radiation filters for the entire range of visible light are suitable.

The segments which are impervious to radiation, as mentioned before, have a larger radius than the segments for the radiation filters transmitting the radiation and serve as modulators for the light barrier L.

The segment between the filters D and E, in contrast to the remaining opaque segments, is provided on its outer edge with radial slots so that instead of a single long dark pulse it generates three short dark pulses. During the clockwise rotation of the modulator disc this slotted segment serves as a reference for a zero position, that means after the occurrence of the three short dark pulses the filter A which lies opposite the filter E, passes through the light beam deflected from the spectral radiometer so that the detector D receives the transmission range pertaining to the radiation of the filtering-modulating segment A as shown in FIG. 5. During the subsequent rotation of the modulator disc, the consecutive transmission ranges corresponding to the radiation filters B through H are detected by the detector D and converted into the corresponding electrical signals. By means of the timing logic and a suitable selection program in the microcomputer, it is possible to select three arbitrary, or in the illustrated embodiment of the modulator up to eight spectral transmission ranges, for the measurement and further application.

Depending on the particular application of the measuring device an arbitrary number of spectral ranges can be selected for the measurement.

The modulator disc M rotates continuously. The data transfer begins, after an arbitrary start of the measurement via the input command unit, only after the filter A intersects the radiation beam from the telescope T. Immediately after the passage of all segments through the radiation beam the iteration computing process is initiated. Prior to this data relating to the ambient temperature can be delivered to the input unit also from other measuring equipment. After several seconds, the results of computation can be displayed on the display unit. The next measuring cycle can be released after a repeated start command in the input unit of the computer. For example, for monitoring purposes it is also possible to perform in response to a single starting command, consecutive, quasi continuous measuring cycles in short intervals. This series of measurements can last until a predetermined number of measurements is reached or in response to a stop command applied to the input unit. For such batch-like mode of operation a storing device for the computed results to be displayed, is necessary. The segments of the modulator which are impervious to radiation can be provided with a reflecting coating to produce a constant reference signal.

The iterative program in the microcomputer computes the sum of the Planck radiation curves, which sum is the most similar to the curve through the measured values and the microcomputer outputs the emissivity, the object temperature and the ambient temperature and displays these data on the display unit. If the radiant intensity is measured then the product of the radiating surface size and emissivity is displayed. If the radiating surface size is known then the emissivity can be determined from the product.

In a modification of the before-described embodiment it is also possible to employ a different (other) spectrometer and measure at different or more spectral ranges (regions) than those shown in the table. It is also possible to store the measured values before their entry into the microcomputer and feed the stored content in the microcomputer at a later time. Since in general only a small microcomputer or microprocessor is needed the device of this invention has the advantage that it can be designed as a portable, compact instrument having a small size and accordingly finding a broad field of economic applications.

Figure 3:
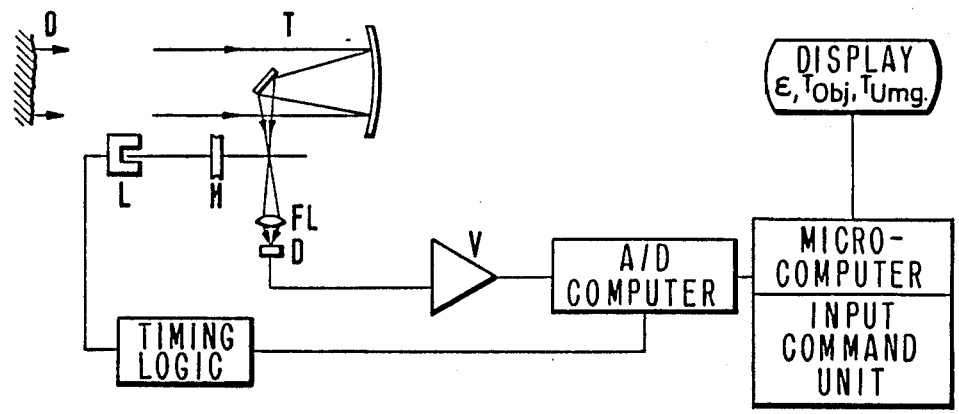
FIG. 3 is a schematic block diagram of a device for the contactless radiation measurement to determine temperature without dependency on the emissivity according to this invention.
Figure 6:
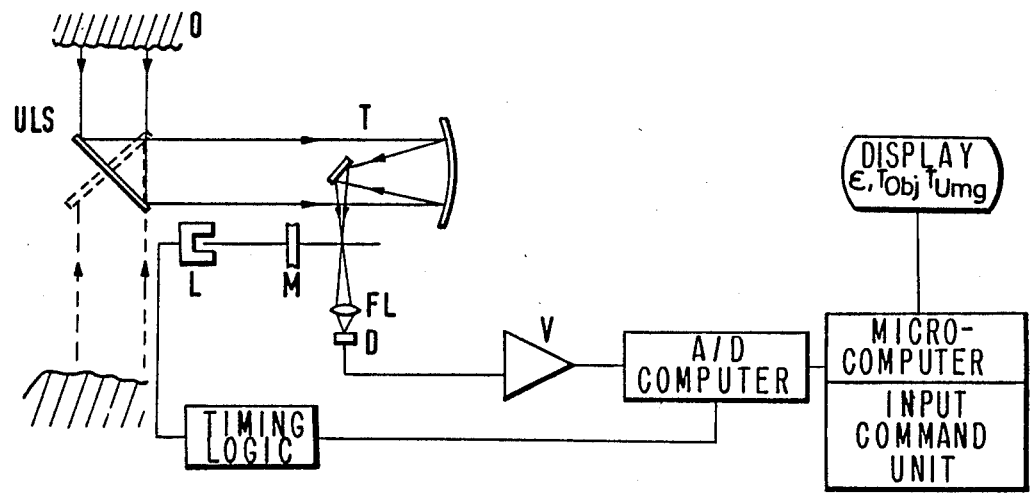
FIGS. 6 and 7 show respectively block circuit diagrams of the modifications of the device of FIG. 3.

An example of a possible modification of the embodiment of FIG. 3 is disclosed in FIG. 6.

In this embodiment, there is used a controllable deviating mirror ULS which in one position deflects the radiation from the object O or in another position thereof, the radiation of the opposite environment, onto the telescope of the spectrometer T. In this case there are made two identical measurements (namely of the object and of the environment) always in the same spectral range but the iterative computation in the microcomputer is performed under the following changes in the equations 1 and 2:

$L_{Tumg, \lambda}$ is to be replaced by $L_{Mumg, \lambda}$; wherein the term $L_{Mumg, \lambda}$ means the measured radiance of the environment at a wavelength $\lambda$.

In this case it is also needed to solve the equation system for two unknown magnitudes only, namely for $T_{obj}$ and $\epsilon$.

Figure 7:
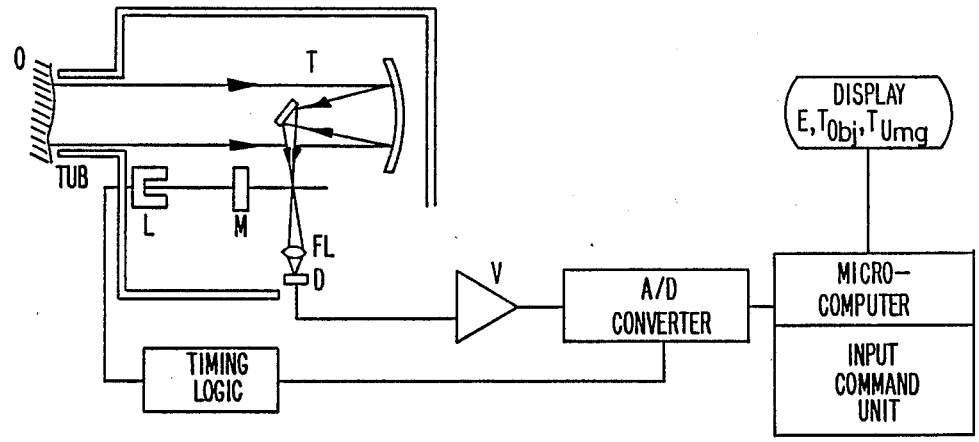

Another modification of the measuring device of FIG. 3 is illustrated in FIG. 7. In this example, the housing of the measuring instrument has an inlet opening provided with a tubular member TUB baffle with black inner wall (that means the emissivity of the black inner wall equals or approaches unity); the tubular member TUB is constructed such that it can be placed (together with the entire measuring instrument) very closely (1 mm for example) opposite the object O to be measured. When the measured object has a cylindrical surface, for example the free end of the tubular member must be shaped with corresponding semi-circular recesses matching the cylindrical object. The tubular member guarantees that a homogeneous ambient radiation (namely from the tubular member and the measuring instrument) impinges on the measured object O. Particularly in the case of objects having a low emissivity and located in thermally non-homogeneous environment (in the environment of several warm objects having different temperatures), this modification is suitable for increasing the measuring accuracy.

Instead of using the projecting tubular member it is also possible in other variation of this invention to enclose the entire measuring arrangement in a housing having black inner walls provided in the optical axis of the measuring instrument with an opening adjusted to the measured object. In this embodiment, a controllable deviating mirror for measuring the inner radiation of the housing, can be used.

In all embodiments using the deviating mirror ULS, the latter can be equipped with an incremental drive which tilts the mirror in short discrete steps so as to measure the ambient radiation from different directions (scanning of the environment). This incremental drive of the deviating mirror is of particular advantage in thermally non-homogeneous environments. This incremental scanning movement if desired, can be performed not only in vertical but also in horizontal direction.

In still another modification of this invention, the ambient radiation can be applied to the detector via an immersion or double aperture lens so that the radiation of the whole half space opposite the measured object is detected. When technically possible, the measurement of the ambient temperature of course can be made by contacting temperature sensors. In thermally non-homogeneous environment it is also advisable to measure the temperature and emissivity of different objects in the environment by means of a corresponding number of measurements at discrete wavelengths.

Figure 8:
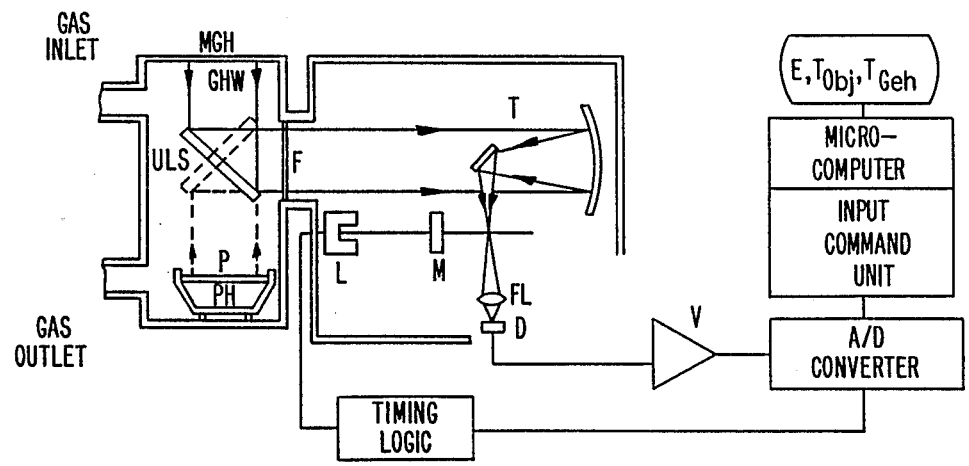
FIG. 8 is a block circuit diagram of a device for determining spectral emissivity of an object or sample according to the method of this invention.

FIG. 8 shows schematically an embodiment of a device for determining the spectral emissivity of an object. In the example shown in FIG. 8, there is provided a measuring housing MGH provided with black inner walls enclosing a sample holder PH supporting a sample P and a heating device PH arranged below the sample P to heat the same. The measuring housing further encloses a controllable deviating mirror ULS arranged opposite a window F in the housing. The window is transparent to visible and/or infrared radiation. The deviating mirror is controllable either electrically or manually from the outside to rotate about its pivot axis in such a manner that in one position it reflects the radiation from the sample P to the window F and in another position it reflects radiation from the black inner wall of the measuring housing MGH opposite the sample, to the window F. The deviating mirror ULS is adjusted so as to direct in both positions thereof the radiation beam parallel to the optical axis of the telescope T of the spectrometer of the measuring device which is attached to the outer side of the window F. The two kinds of radiation deflected by the mirror ULS through window F are again collected in the telescope of the spectrometer, deflected and focussed against the modulator M and upon modulation focussed by a field lens FL against an optoelectric detector D. The output electrical signals from the detector proportional to the impinging radiation are amplified in an amplifier V, digitalized in the analog/digital converter in synchronism with the clock pulses from the timing logic circuit, and applied in the digital form to the input unit of the microcomputer. The microcomputer processes the digitalized measured values by iterating the Planck radiation law to compute the emissivity $\epsilon$, the sample temperature $T_{Obj}$ and the housing temperature $T_{Geh}$. As in the preceding example, the emissivity, the sample temperature and the housing (ambient) temperature are read by means of a display device.

The construction and the operation of the microcomputer and of the modulator in all embodiments are the same as described before in connection with FIG. 3. According to the application requirements, an arbitrary number of spectral ranges for the measurement can be selected. The disc of the modulator rotates continuously and the measuring data transfer starts after an arbitrary starting time set by the command input unit and then only when the filter A of the modulator crosses the radiation beam from the spectral radiometer. The deviating mirror ULS first deviates the radiation beam from the sample P to the window F. Immediately after the passage of all modulator segments across the deviated radiation beam, the deviating mirror ULS is tilted to another position either manually or by a motor controlled by the microcomputer so that radiation emanating from the portion of the inner wall of the housing is directed to the spectral radiometer. Again, the data transfer starts only after the completion of the tilting of the mirror and after the filter A has crossed the radiation beam to the detector.

For the range of visible as well as infrared radiation filters for the entire range are suitable, where for measurement in the infrared the measurement housing can be purged (filled) with a gas transparent to infrared radiation, such as nitrogen.

Immediately after the complete passage of all segments of the modulator across the beam, the iterative computation is initiated. The result of the computation is displayed after several seconds on the display device. The next measuring cycle can be then released by a new starting command applied to the input unit. For example, for measuring during the heating up phase of the sample it is also possible to release by a single start command a succession after few seconds intervals for example, of quasi continuous measurements. This measuring series can terminate after a predetermined number of individual measuring steps or in response to a stop command applied to the input unit. In this case an additional storing device for the computation results is to be provided. In the case when the sample itself is a black or gray radiator, the measurement of radiation of the inner wall portion can be dispensed with.

Also in this embodiment, segments of the modulator disc which are impervious to radiation can be metalized to produce a constant signal reference. The iterative program computes the sum of curves according to Planc radiation law and from the resulting curve which runs most closely to the measured values, the emissivity, object temperature and also the housing temperature are determined and displayed.

In a modification of the latter embodiment it also possible to use a different (other) spectrometer and to select other and/or more spectral transmission ranges than those described before. Also the measured data can be first stored and then applied to the microcomputer at a later time point. Depending on the particular application the measuring instrument can be equipped with a detector or with filters for either the visible or for the infrared spectrum portion only or with a detector and filters which are sensitive over the entire spectral range of visible and infrared radiation. Of course, it is also possible to design the device with interchangeable detectors, modulator discs and/or filter segments. The deviating mirror can also be equipped with an incremental drive to tilt the mirror in discrete steps so as to measure the radiation from the inner wall of the housing from different directions. Moreover, the sample holder can be also equipped with a cooling device which in certain applications enables the cooling of the sample or specimen. In order to prevent ice coating the housing can be flooded with circulating dry (water-free) gases. Also in this embodiment the iterative computation can be generally performed by a small microprocessor which can be directly installed in a measuring device for carrying out the method of this invention so that small sized compact instrument is provided which has an increased field of economic application possibility.

It will be understood that each of the elements described above, or two or more together, may also find a useful application in other types of constructions differing from the types described above.

While the invention has been illustrated and described as embodied in specific examples for turning of the contactless temperature measuring method, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for contactless actual temperature measurement of an object, comprising:
   a spectrometer for measuring radiation in discrete wavelength ranges, the spectrometer including a radiation modulator having a plurality of filters for selectively passing a succession of visible and/or infrared radiation beams of radiation emitted by the object corresponding to the transmission ranges of the filters;
   a detector arranged opposite the modulator for producing electrical output signals proportional to the radiation passing through the modulator;
   an analog/digital converter connected to the detector via an amplifier;
   a timing circuit connected to the modulator for supplying to the analog/digital converter clock pulses at a clock frequency which are synchronized with the modulator whereby the analog/digital converter generates digital signals at the clock frequency;
   a microprocessor programmed for an iterative computation and having an input unit connected to the analog/digital converter and a display unit for indicating the actual temperature, emissivity of the object and the environment temperature; and
   a controlled deviating mirror tiltable between a first and a second position relative to the object and the environment, the tilting mirror being adjusted so as to direct in the first position thereof the radiation emerging from the object, and in the second position thereof similarly directing the radiation emitted by the environment, into the spectrometer.

2. A device for determining spectral emissivity of an object with high accuracy, comprising:
   a spectrometer having an inlet for receiving visible or infrared filtered radiation from a measured object;
   a modulator provided with at least two filters for consecutively passing the radiation in discrete visible and/or infrared wavelength ranges;
   a detector arranged opposite the modulator for converting the filtered radiation into a corresponding electrical signal;
   an analog/digital converter for converting said electrical signal into a digital signal, connected to the detector;
   a timing logic circuit connected between the modulator and the analog/digital converter to clock the digital signal at the output of the converter in synchronism with the modulator;
   a microprocessor connected to the output of the analog/digital converter programmed for iterative computation and having its output connected to a display unit;
   a closed measuring housing having black inner walls and an output window communicating with the inlet of the spectrometer, emissivity of the inner wall of the measuring housing being unity;
   a sample holder arranged at one end of the measuring housing, the measured object having the form of a sample supported in the sample holder;
   a heating and/or cooling device arranged in the sample holder to heat and/or cool the sample;
   a controllable deviating mirror rotatably supported in the measuring housing opposite the window and being tiltable between a first and a second position for reflecting in the first position thereof the radiation from the sample into the window and, in the second position thereof, reflecting the radiation from an opposite inner wall portion of the measuring housing into the window, the deviating mirror being adjusted for similarly reflecting radiation in either position thereof such that iteration of values received by the detector, the emissivity of the object is then computed in said microprocessor and displayed on said display unit.

3. A device as defined in claim 2, wherein the measuring housing is provided with means for flooding the housing with a gas.

4. A device as defined in claim 1 or 2, wherein the detector is sensitive to visible/infrared radiation in the range up to a wavelength of about 14 microns, and the modulator having filters which are transparent for discrete wavelengths of radiation within this range.

5. A method of simultaneous, contactless measurement of the temperature of an object, values of its spectral emissivity and the ambient temperature, comprising the steps of:
   (a) detecting values of spectral radiance or spectral radiant intensity $L_M, \lambda i$ in a plurality of visible or infrared wavelength ranges;

(b) placing the measured values in a set of at least three equations as follows:

$$L_{M,\lambda 1} = \epsilon \cdot L_{Tobj,\lambda 1} + (1-\epsilon) \cdot L_{TUmg,\lambda 1}$$

$$L_{M,\lambda 2} = \epsilon \cdot L_{Tobj,\lambda 2} + (1-\epsilon) \cdot L_{TUmg,\lambda 2}$$

$$L_{M,\lambda 3} = \epsilon \cdot L_{Tobj,\lambda 3} + (1-\epsilon) \cdot L_{Tumg,\lambda 3}$$

where the measured values $L_{M,\lambda i}$ are expressed as the sum of the radiance $L_{Tobj,\lambda i}$, according to Planck's radiation law, of a black body of temperature $T_{obj}$ of the object, multiplied by the object and the radiance $L_{TUmg,\lambda i}$, according to Planck's of a black body of temperature $T_{Umg}$ of the environment of the object, multiplied by the reflectivity $\rho$ of the object expressed in the object's emissivity $\epsilon$ as $1-\epsilon$; and (c) solving iteratively this set of equations to obtain the true values of the temperature $T_{obj}$, the emissivity $\epsilon$ of the object and the temperature $T_{Umg}$ of the environment of the object.

6. The method of claim 5, wherein for a known temperature $T_{Umg}$ of the environment, temperature $T_{obj}$ and emissivity of the object are calculated from a set of at least two equations.

7. The method of claim 5, wherein spectral radiance or spectral radiant intensity values are detected at n different wavelengths and a set of n equations is formed, the solution of which is used to increase the accuracy of the resulting temperature $T_{obj}$ and emissivity of the object and temperature $T_{Umg}$ of the environment or to calculate in addition to $T_{obj}$ and $T_{Umg}$ the different values of the spectral emissivity $\epsilon$ of an object which is not a grey body.

* * * * *